US008300851B2

(12) United States Patent
Shin et al.

(10) Patent No.: US 8,300,851 B2
(45) Date of Patent: Oct. 30, 2012

(54) METHOD OF MANAGING SOUND SOURCE AND APPARATUS THEREFOR

(75) Inventors: Jung-eun Shin, Suwon-si (KR); Eun-ha Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1470 days.

(21) Appl. No.: 11/270,476

(22) Filed: Nov. 10, 2005

(65) Prior Publication Data

US 2006/0122841 A1 Jun. 8, 2006

(30) Foreign Application Priority Data

Dec. 8, 2004 (KR) ........................ 10-2004-0103085

(51) Int. Cl.
*H04B 1/00* (2006.01)

(52) U.S. Cl. ........ 381/119; 704/278; 345/441; 348/515; 700/94

(58) Field of Classification Search .................. 381/119, 381/56, 118; 704/278, 500, 255, 256.8, 273; 348/515; 700/94; 345/441
See application file for complete search history.

(56) References Cited

U.S. PATENT DOCUMENTS

| | | | | |
|---|---|---|---|---|
| 5,801,694 A * | 9/1998 | Gershen | ........................ | 715/727 |
| 5,915,288 A * | 6/1999 | Gabriel | ........................... | 84/609 |
| 6,319,130 B1 * | 11/2001 | Ooseki et al. | ................... | 463/43 |
| 6,353,170 B1 * | 3/2002 | Eyzaguirre et al. | ............. | 84/603 |
| 2002/0163533 A1 * | 11/2002 | Trovato et al. | ................ | 345/728 |

FOREIGN PATENT DOCUMENTS

| | | | | |
|---|---|---|---|---|
| JP | 05-181464 | A | | 7/1993 |
| JP | 11-219443 | A | | 8/1999 |
| JP | 11219443 | A | * | 8/1999 |
| KR | 1999-026410 | A | | 4/1999 |
| KR | 10-2001-0026276 | A | | 4/2001 |
| KR | 10-2004-0048793 | A | | 6/2004 |
| KR | 10-2004-0069298 | A | | 8/2004 |

OTHER PUBLICATIONS

Audio Information Browsing With the Sonic Browser—Authors: Eoin Brazil, Michael Fernstrom, Coordinated and Multiple Views in Exploratory Visualization, 2003. Proceedings, International Conference on Jul. 15, 2003, Piscataway, NJ., USA, IEEE, pp. 28-34, XP010647139 ISBN: 0-7695-2001-4—paragraph [03.4].

* cited by examiner

*Primary Examiner* — Vivian Chin
*Assistant Examiner* — Paul Kim
(74) *Attorney, Agent, or Firm* — Sughrue Mion, PLLC

(57) ABSTRACT

A method of managing a sound source in a digital AV device and an apparatus thereof are provided. The method of managing a sound source in a digital AV device includes: extracting at least one sound source from sound being reproduced through the digital AV device; mapping an image to the extracted sound source; and managing the sound sources by using the mapped image. In addition, preferably, the extracted sound source is registered, changed, deleted, selectively reproduced, or selectively deleted by using the image. Accordingly, sound being output can be visually managed by handling the sound sources separately, a desired sound source can be selectively reproduced or removed such that utilization of the digital AV device can be enhanced.

16 Claims, 7 Drawing Sheets

METHOD OF MANAGING SOUND SOURCE AND APPARATUS THEREFOR

CROSS-REFERENCE TO RELATED PATENT APPLICATIONS

This application claims the benefit of Korean Patent Application No. 10-2004-0103085, filed on Dec. 8, 2004, in the Korean Intellectual Property Office, the disclosure of which is incorporated herein in its entirety by reference.

BACKGROUND OF THE INVENTION

1. Field of the Invention

The present invention relates to a digital audiovisual (AV) device, and more particularly, to a method of managing a sound source in a digital AV device which outputs sound, and an apparatus therefor.

2. Description of the Related Art

Recently, digital AV devices, including DVD players, home theater systems, and multifunction digital TVs, have become widely used. In particular, the home theater system, which creates a theater-like atmosphere in the home, has been winning popularity. The home theater includes a video device, such as a projector, a projection TV, a PDP, or a digital TV, an AV decoder supporting a digital theater system with basic 5.1 or more channels or Dolby digital, and a speaker system with 5.1 or more channels. The video device can produce an image as clear as that in a theater, and the AV decoder and speaker system can recreate magnificent theater-quality sound.

However, the conventional digital AV device cannot provide a function for extracting, managing and displaying a specific sound source included in sound being reproduced. In addition, it cannot provide a function for selectively reproducing a specific sound source from the sound being reproduced.

SUMMARY OF THE INVENTION

The present invention provides a method of managing a sound source in a digital AV device, and an apparatus thereof.

According to an aspect of the present invention, there is provided a method for managing a sound source in a digital audio visual (AV) device, the method including: extracting at least one sound source from sound being reproduced through the digital AV device; mapping an image to the extracted sound source; and managing the sound sources by using the mapped image.

In extracting the sound source, the sound source may be extracted by using the frequency characteristics of the sound source beforehand sampled from the sound being reproduced.

In mapping the image, mapping information in relation to the image representing the sound source may be stored in a database.

Managing the sound source may include mapping a new image to the sound source and registering the new image and the mapping information in a database.

Managing the sound source may include displaying images corresponding to the sound sources.

In displaying the images, at least one of the representative image, the type and the current reproduction status of each sound source included in the sound currently being reproduced, may be displayed.

Managing the sound source may include selectively reproducing part of the extracted sound sources.

Managing the sound source may include selectively removing part of the extracted sound sources and reproducing the remaining sound sources.

Managing the sound source may include selecting and deleting images corresponding to part of the extracted sound sources.

Managing the sound source may include changing images corresponding to part of the extracted sound sources to other images.

According to another aspect of the present invention, there is provided a computer readable recording medium having embodied thereon a computer program for executing the method of managing a sound source.

According to another aspect of the present invention, there is provided an apparatus for managing a sound source in a digital AV device, the apparatus including: an extraction unit which extracts at least one sound source from sound being reproduced through the digital AV device; a mapping unit which maps an image to each sound source; and a managing unit which manages the sound sources by using the mapped images.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
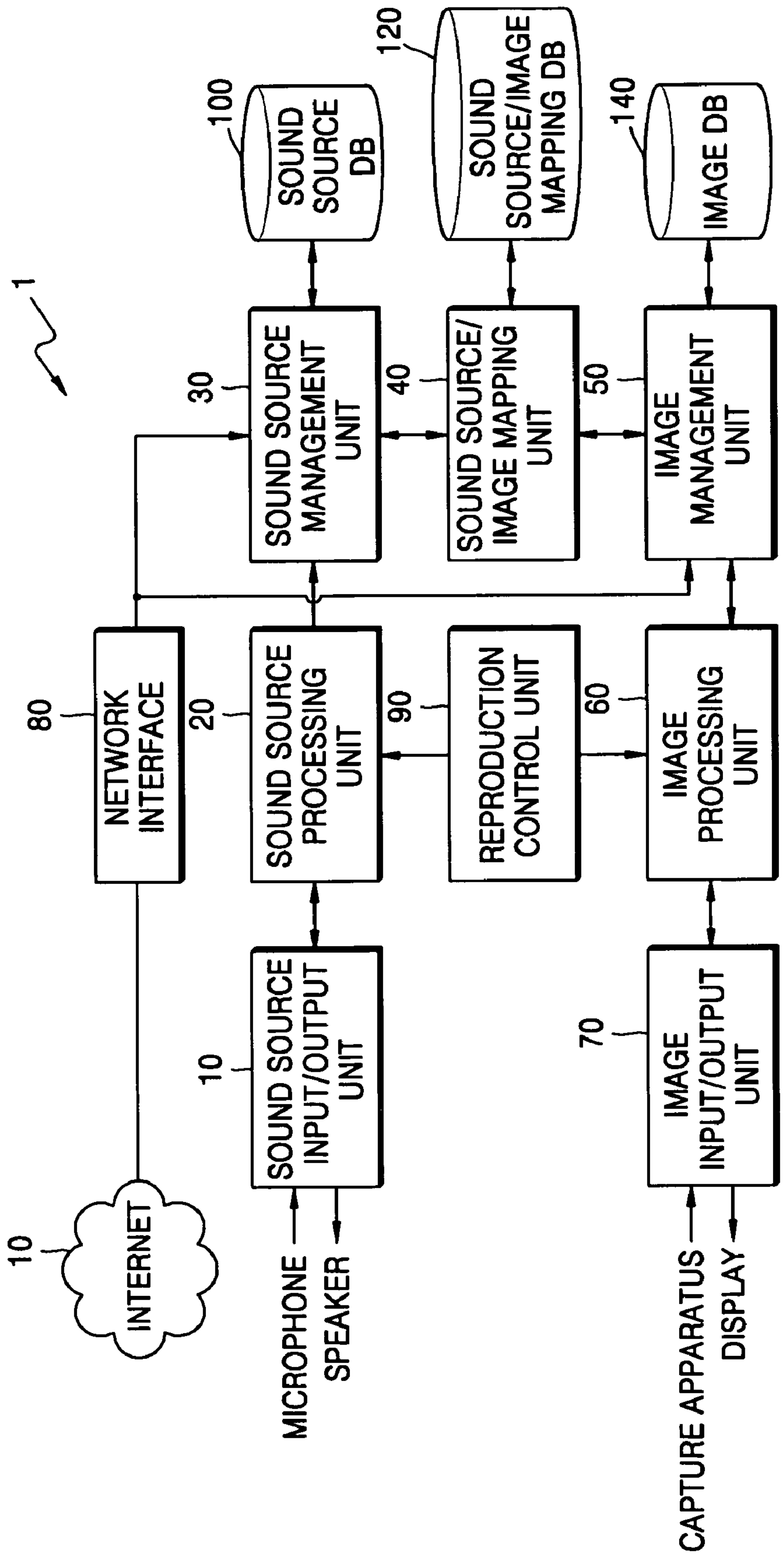
FIG. 1 illustrates an exemplary embodiment of the structure of an apparatus for managing a sound source by using an image according to the present invention.

Referring to FIG. 1, an apparatus 1 for managing a sound source by using an image includes a sound source input/output unit 10, a sound source processing unit 20, a sound source management unit 30, an image input/output unit 70, an image processing unit 60, an image management unit 50, a reproduction control unit 90, a sound source/image mapping unit 40, and databases 100, 120 and 140. Additionally, the apparatus 1 may further include a network interface 80.

The sound source input/output unit 10 receives an input of a sound signal through a microphone or another input source, and transfers the sound source to the sound source processing unit 20, or outputs a sound signal processed by the sound source processing unit to a speaker or another output device. The sound signal input through the sound source input/output unit 10 is processed as digital data by the sound source processing unit 20 and can be used as a sampling sound source. At this time, the sound source processing unit 20 analyzes the frequency characteristics of the input sound signal and extracts at least one registered sound source included in the sound. The information on the frequency characteristics of a sound source, generated in the process for analyzing the sound source, that is, in the sampling process, is stored in the sound source database 100 by the sound source management unit 30, and is used to extract a registered sound source from other input sound. The sound source management unit 30 stores the sound source data processed as digital data and sampled by the sound source processing unit 20, in the sound source database 100, or reads sound source data stored in the sound source database 100 and senses whether or not there is a corresponding sound source in input sound.

Meanwhile, the image input/output unit 70 receives an image captured through a digital camera or a digital camcorder and transfers the image to the image processing unit 60, or outputs image data decoded by the image processing unit 60 through a display unit. The image input through the image input/output unit 70 can be used as a means for displaying and/or managing a sound source after being encoded by the image processing unit 60. The image management unit 50 manages images so that the image data encoded by the image processing unit 60, can be stored in the image database 140, or the stored image data from the image database 140 can be read, decoded and reproduced. The reproduction control unit 90 controls the reproduction of sound source data through the sound source processing unit 20 and the reproduction of image data through the image processing unit 60.

Meanwhile, the sound source/image mapping unit 40 maps image data which is registered, changed, or deleted in the image management unit 50, to sound source data which is registered, changed, or deleted in the sound source management unit 30, and stores the mapping information in the sound source/image mapping database 120. By using the mapping information, the stored sound source can be easily managed using the image data.

A method of managing a sound source by using an image including registration, change, deletion, selective reproduction or selective deletion, based on the structure of the apparatus 1 for managing a sound source described above will now be explained.

Figure 2:
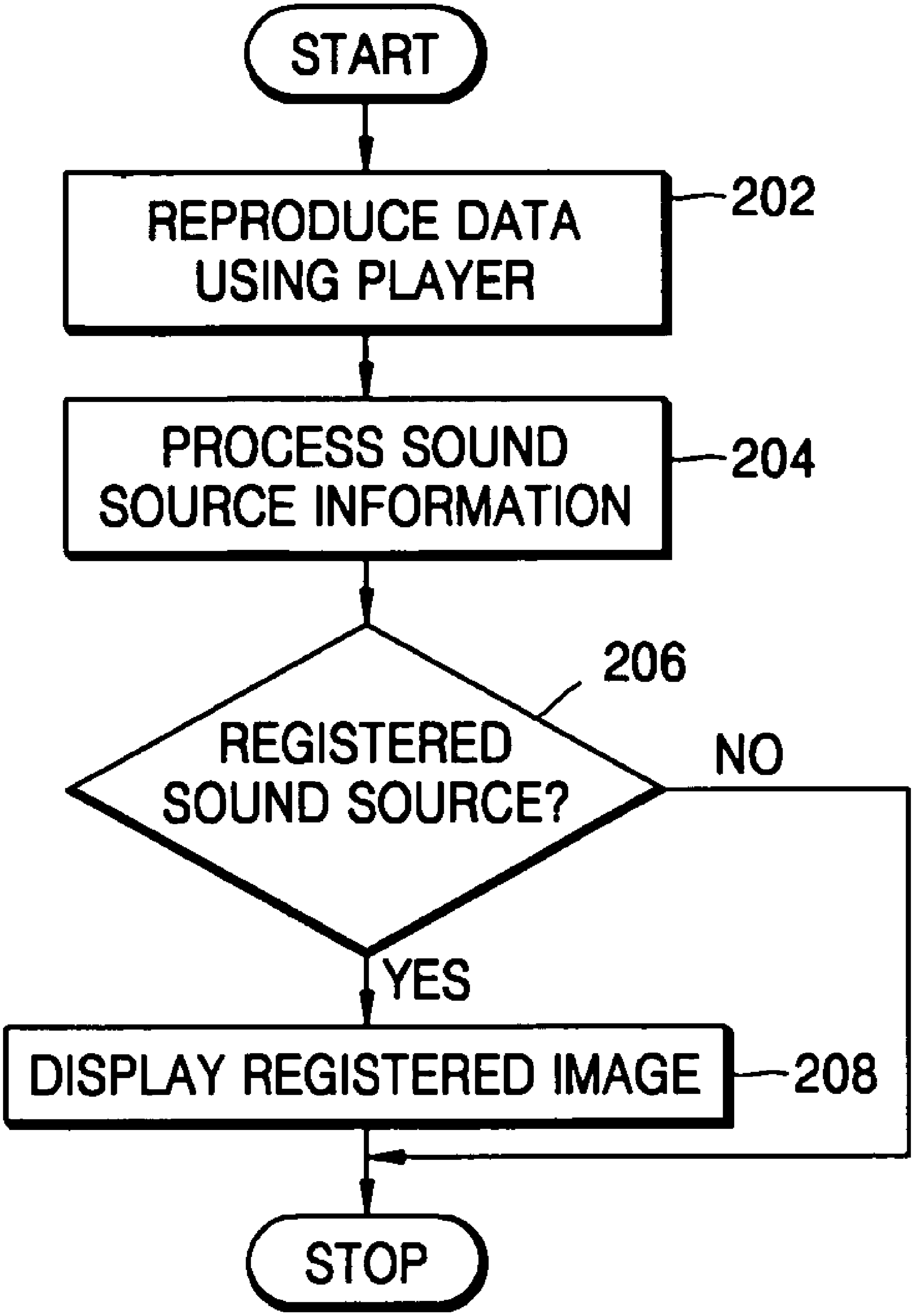
FIG. 2 is a flowchart of a method for displaying an image corresponding to a sound source according to an exemplary embodiment of the present invention.

FIG. 2 is a flowchart of a method for displaying a sound source according to an exemplary embodiment of the present invention.

Referring to FIG. 2, if AV data is reproduced using a digital AV device having the apparatus 1 for managing a sound source with an image according to the present invention in operation 202, by using the frequency range or frequency characteristics of the sound data being reproduced, the sound data is sampled and sound sources corresponding to respective sound source ranges are extracted in operation, 204. If the extracted sound sources are sound sources registered in the sound source database 100 described above in operation 206, then by referring to the mapping information of the image mapping database 120, images corresponding to the sound sources are read in the image database 140, and displayed on a display unit in operation 208.

For example, if the sound being reproduced through the digital AV device is orchestral music, then by using the frequency characteristics of each musical instrument, such as violin, viola, cello, and double bass, the sound source for the musical instrument can be extracted from the sound being reproduced. By using the sound source database 100, it is confirmed whether or not the extracted sound source for each musical instrument is a registered sound source. Then, if it is a registered sound source, an image corresponding to the sound source is displayed on the display unit by referring to the mapping information of the sound source/image database 120. Accordingly, the image of the musical instruments currently being reproduced can be displayed on the screen. That is, if registered sound sources such as those of a violin and a piano are reproduced, images corresponding to the sound sources can be displayed.

Furthermore, if the sound source being reproduced is not a registered one but a new one, this can be registered together with an image corresponding to the sound source. For example, a user can register the voice of their baby as a sound source, register the photo of the baby as a new image, and store mapping information mapping the voice and photo of the baby in the sound source/image database 120. Accordingly, while moving pictures of the family are reproduced, if the voice of the baby is output, the newly registered photo of the baby can be displayed on the display unit.

Figure 7:
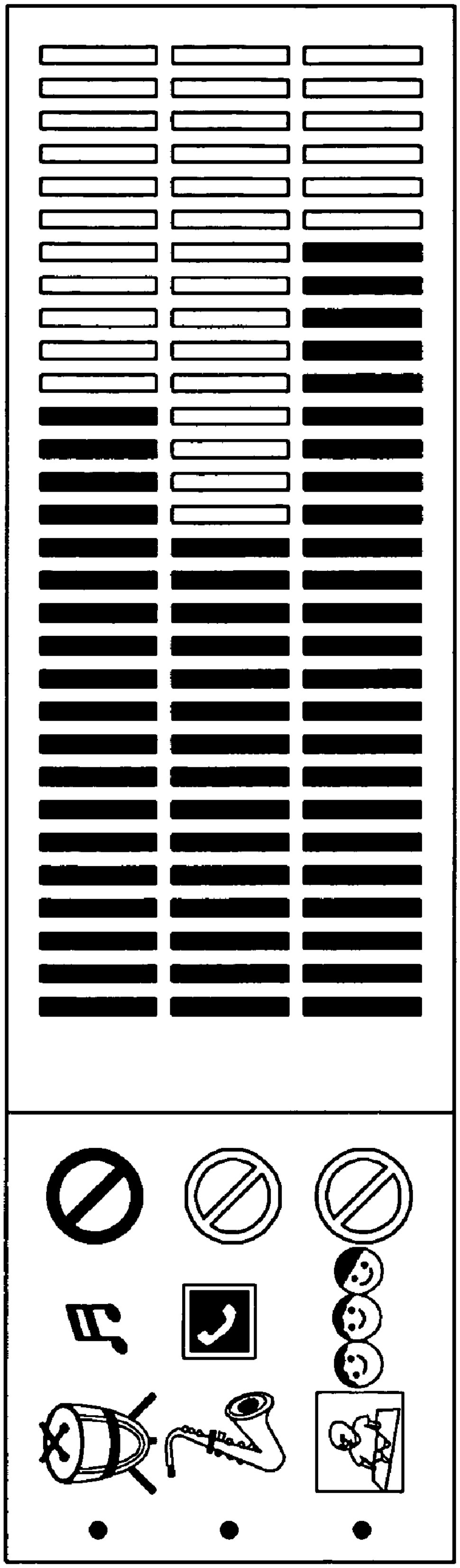
FIG. 7 illustrates an example of a screen on which sound source information being reproduced is displayed as an image according to the present invention.

More specifically, FIG. 7 illustrates an example of a screen on which sound source information being reproduced is displayed as an image according to the present invention. Referring to FIG. 7, it can be seen that the sound of a saxophone and a voice are currently being reproduced, and the sound of a drum is not reproduced. That is, sound sources included in the music currently being reproduced are displayed as images, and the types and the reproduction states of the sound sources can be displayed on the display unit. As a result, the user can watch the visual sound output information while listening to the music. In addition, the volume of each sound source being reproduced can also be displayed on the screen.

Figure 8:
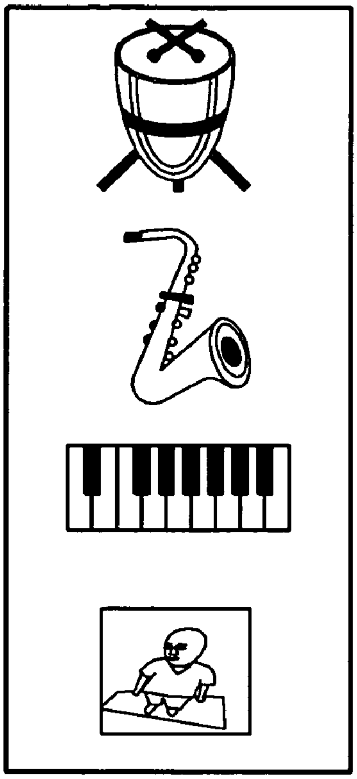
FIG. 8 illustrates an example of a screen on which a sound source being reproduced is displayed as an image according to the present invention.

Also, FIG. 8 illustrates an example of a screen on which a sound source being reproduced is displayed as an image according to the present invention. Referring to FIG. 8, the images displayed on the display screen show that a drum, a saxophone, and a piano are being played, and a singer is singing. Thus, by extracting each sound source from the sound being reproduced and expressing it as an image, the sound source can be easily managed by selecting, changing, or deleting the displayed image.

Figure 9:
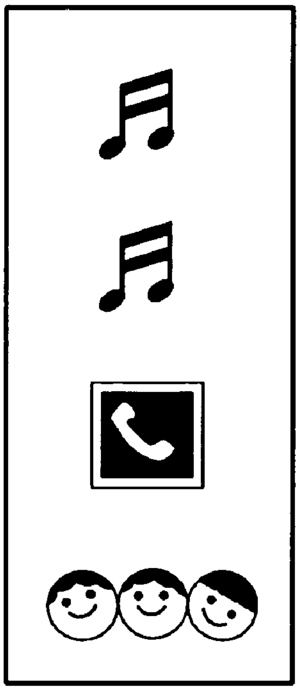
FIG. 9 illustrates an example of a screen on which the type of a sound source being reproduced is displayed as an image according to the present invention.
Figure 10:
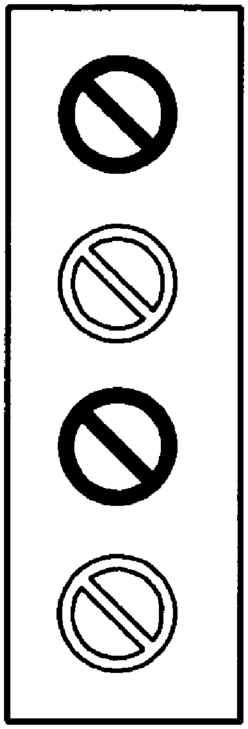
FIG. 10 illustrates an example of a screen on which the output status of a sound source being reproduced is displayed according to the present invention.

FIG. 9 illustrates an example of a screen on which the type of a sound source being reproduced is displayed as an image according to the present invention. Referring to FIG. 9, it is indicated whether the type of a sound source included in the sound currently being reproduced is music, background sounds, or voice. FIG. 10 illustrates an example of a screen on which the output status of a sound source being reproduced is displayed according to the present invention. Referring to FIG. 10, it is indicated whether or not each of the sound sources included in the sound being reproduced is currently output. According to the present invention, the user can handle the sound sources in a variety of ways. For example, the user can easily selectively reproduce some sound sources, or selectively remove some sound sources and output the others, by handling the images displayed on the display. In this case, by displaying the output status of each sound source as shown in FIG. 10, the convenience of the user can be enhanced.

Figure 3:
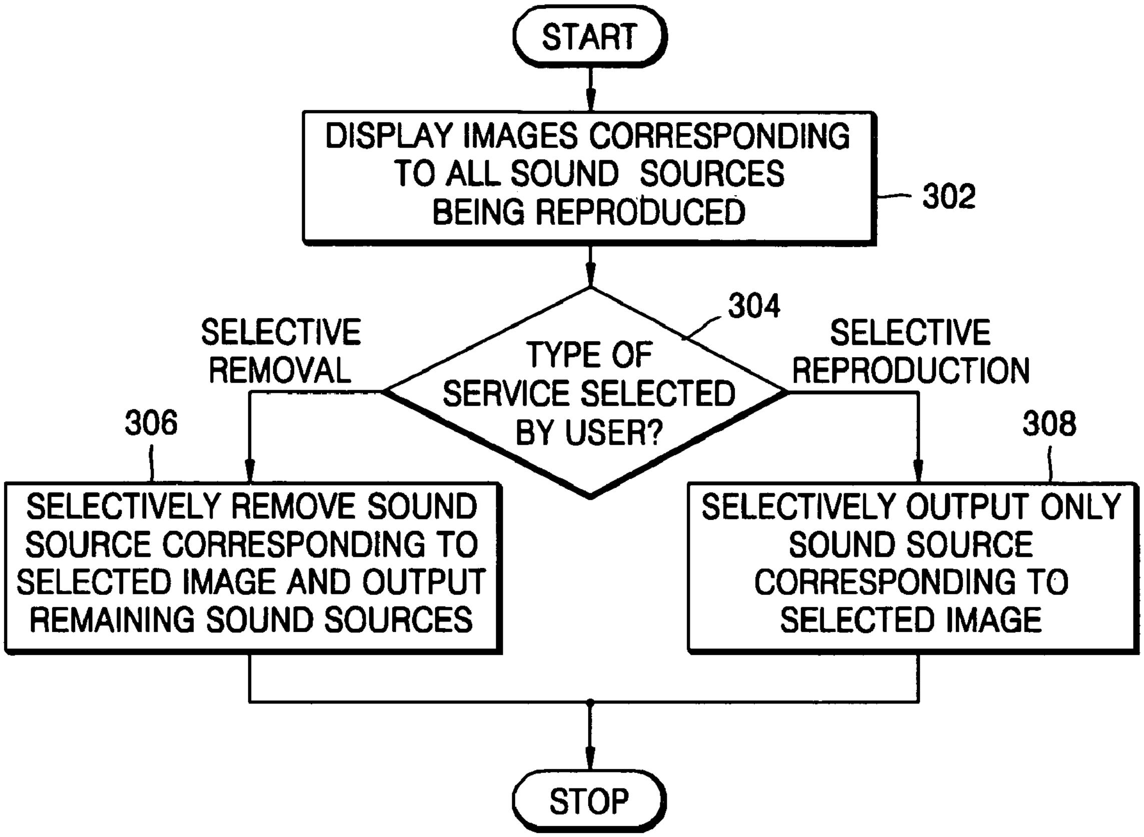
FIG. 3 is a flowchart of a method for selectively reproducing or removing a sound source according to an exemplary embodiment of the present invention.

Meanwhile, FIG. 3 is a flowchart of a method for selectively reproducing or removing a sound source according to a preferred embodiment of the present invention.

Referring to FIG. 3, if sound sources being reproduced are all displayed as images on the display screen in operation 302, selection information for a service is input by the user in operation 304. If the selection information indicating selective reproduction is input by the user, only the sound source corresponding to the image selected by the user is output in operation 308. Meanwhile, if the selection information indicating selective removal is input by the user, only the sound source corresponding to the image selected by the user is removed, and the remaining sound sources are output in operation 306.

For example, after moving pictures of a family are taken by a camcorder or the like, one sound source, such as the voice of a baby, can be selectively removed. Also, specified noise or background sound can be removed from the output. That is, among the sound sources included in the input sound, only the selected sound sources are removed, and the others are output. As another application example, in the case of a digital AV device having a karaoke function, the image corresponding to a sound source desired to be removed can be selected and removed, so that the reproduction of the sound source can be stopped. The user can stop a specified sound source such as that of a tambourine, a piano or a chorus.

Also, if string quartet music is listened to through a digital AV device according to the present invention, after listening to a violin, a viola, and a cello in the first movement, the user can stop the output of the sound sources of the viola and cello in the second movement, in order to only listen to the violin. Then, if the use removes the violin and selects the viola and the cello while listening to the violin in the third movement, he or she can listen to only the viola and the cello from that time. Thus, according to the present invention, the user can select and reproduce one sound source, or can delete one sound source and reproduce the remaining sound sources. This is because each of the sound sources is managed by using images, and it is possible for the user to easily selectively reproduce or remove each sound source.

Meanwhile, a sound source selected by the user can be selectively reproduced. For example, when listening to a musical performance, by selecting a violin from among the displayed images of the sound sources, the user can listen to only the violin for part of the song, and then by selecting the image of the cello, can listen to only the cello. Thus, by distinguishing and managing each sound source with an image, when the sound is output, each sound source can be distinguished and selectively output.

As another application example, when studying a language, or memorizing a script, by turning on the sound of one actor and turning off the sound of another actor, the user can practice the dialog of the second actor.

Figure 4A:
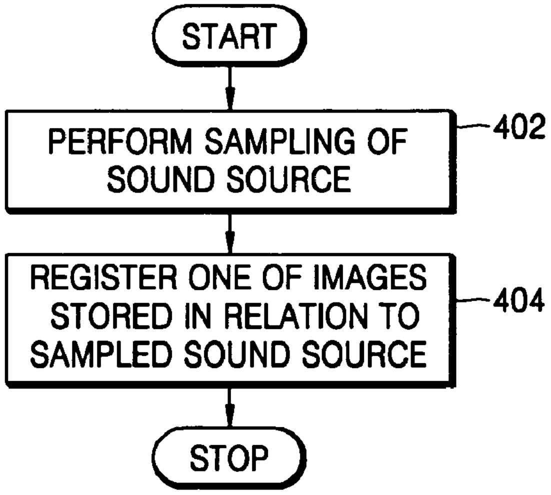
FIGS. 4A and 4B are flowcharts of methods for registering a sound source according to preferred embodiments of the present invention.
Figure 4B:
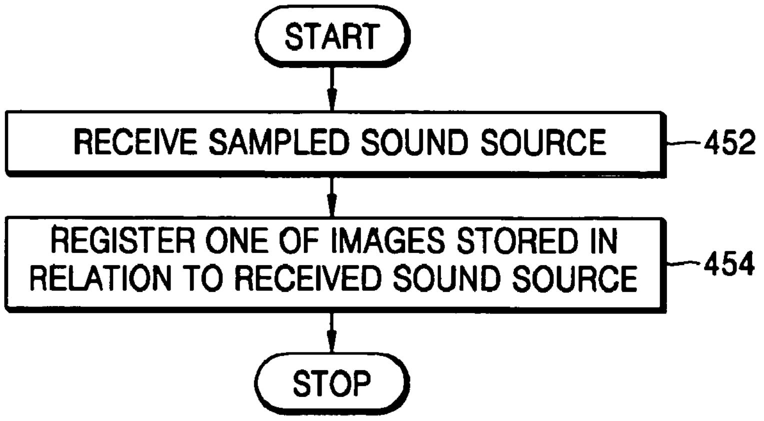

FIGS. 4A and 4B are flowcharts of methods for registering a sound source according to exemplary embodiments of the present invention.

FIG. 4A shows a method by which a sound source input through the sound source input/output unit 10 is sampled in operation 402, and one of the stored images is registered in relation to the sampled sound source in operation 404. FIG. 4B shows another embodiment by which a sound source sampled by another apparatus is received through the network interface 80 in operation 452, and one of stored images is registered in relation to the received sound source in operation 454. The sound source sampled or received through the registration processes described above is stored in the sound source database 100, the image corresponding to the sound source is stored in the image database 140, and the mapping information indicating the corresponding relation of each sound source and the image is stored and managed in the sound source/image mapping database 120. While a sound source or an image stored in the database can be used as the sound source and image for management, a new sound source or a new image can also be used, after being newly registered through the sound source input/output unit 10 or the image input/output unit 70. At this time, since the registered sound source has a unique frequency range or characteristics, the sound source can be distinguished from other sound sources and managed. Information on the unique frequency range or characteristics of a registered sound source can be separately stored and used in order to detect whether or not sound currently being reproduced includes a registered sound source.

Figure 5:
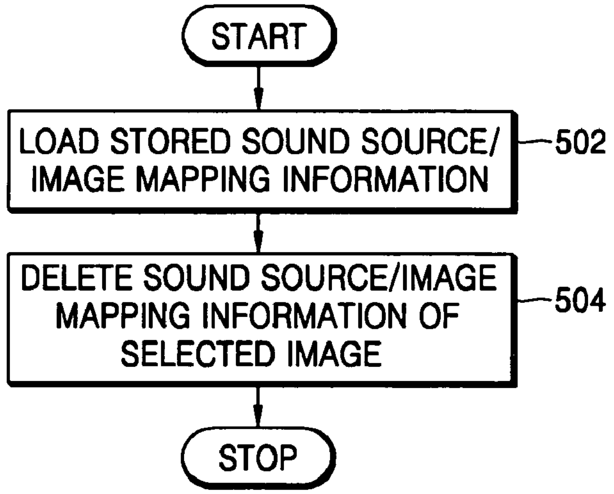
FIG. 5 is a flowchart of a method for deleting a sound source according to an preferred embodiment of the present invention.

FIG. 5 is a flowchart of a method for deleting a sound source according to an exemplary embodiment of the present invention.

As shown in FIG. 5, the sound source/image mapping unit 40 loads sound source/image mapping information from the sound source/image mapping database 120 in operation 502, and by deleting the sound source/image mapping information of a selected image, can delete the registered sound source (operation 504). Sound source information can also be permanently deleted from the sound source database 100.

Figure 6:
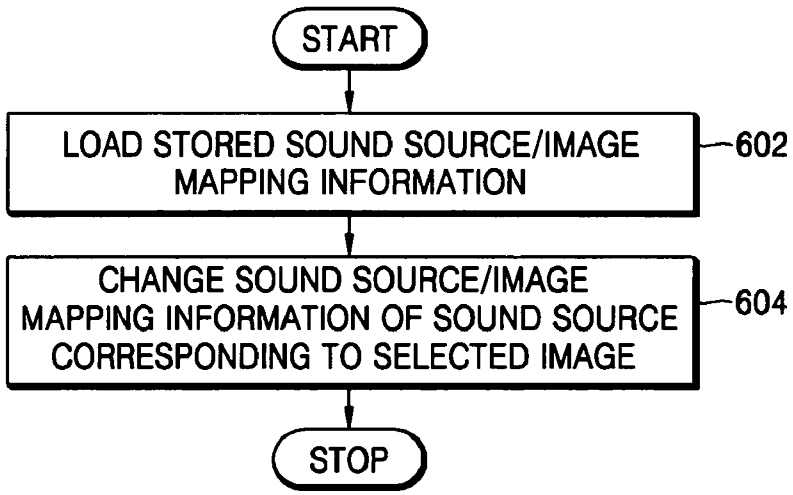
FIG. 6 is a flowchart of a method for changing sound source information according to an exemplary embodiment of the present invention.

FIG. 6 is a flowchart of a method for changing sound source information according to an exemplary embodiment of the present invention. Referring to FIG. 6, stored sound source/image mapping information is loaded in operation 602, and by changing the sound source/image mapping information of the sound source corresponding to a selected image, the image corresponding to the registered sound source can be changed (operation 604).

As described above, by managing each sound source after mapping an image to the sound source according to the present invention, the sound source can be easily managed. For example, a sound source included in sound being reproduced can be visually displayed, some sound sources displayed can be selectively reproduced or deleted, and the sound source of a selected image can be deleted or changed. Accordingly, while listening, the user can conveniently visually identify the sound output information, select a sound source not to listen to, or select only one sound source to listen to. By doing so, the utilization of the digital AV device can be enhanced.

Meanwhile, the method of managing a sound source with an image according to the present invention described above can be implemented as a computer program. Code and code segments forming the program can be easily inferred by programmers in the technology field of the present invention. Also, the program can be stored in computer readable media, and read and executed by a computer to implement the method of the present invention. The computer readable media includes magnetic recording media, optical recording media and carrier wave media.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention as described above, a method of managing a sound source with an image in a digital AV device and an apparatus thereof are provided.

Accordingly, the output sound can be visually managed by handling the sound sources separately, and a desired sound source can be selectively reproduced or removed, such that utilization of the digital AV device can be enhanced.

What is claimed is:

1. A method for managing a sound source in a digital audio visual (AV) device, the method comprising:

extracting one or more sound sources from sound being reproduced through the digital AV device;

comparing the extracted one or more sound sources to sound source data stored in a sound source database;

mapping an image of the extracted one or more sound sources to a corresponding one of the extracted one or more sound sources based on the results of the comparing operation; and managing the extracted one or more sound sources by using the one or more mapped images, wherein the sound source comprises an object that generates a sound signal having a unique frequency characteristic.

2. The method of claim 1, wherein in extracting the one or more sound sources, the one or more sound sources are extracted by using frequency characteristics of the one or more sound sources sampled beforehand from the sound being reproduced.

3. The method of claim 1, wherein in mapping the one or more images, mapping information in relation to the one or more images representing the one or more sound sources is stored in a database.

4. The method of claim 1, wherein managing the one or more sound sources comprises:

mapping one or more new images to the one or more sound sources and registering the one or more new images and the mapping information in a database.

5. The method of claim 1, wherein managing the one or more sound sources comprises:

displaying one or more images corresponding to the one or more sound sources.

6. The method of claim 5, wherein in displaying the one or more images, at least one of the representative image the type and the current reproduction status of each of the one or more sound sources included in the sound is displayed.

7. The method of claim 1, wherein the one or more extracted sound sources comprise at least two extracted sound sources and managing the at least two extracted sound sources comprises:

selectively reproducing part of the at least two extracted sound sources.

8. The method of claim 1, wherein the one or more extracted sound sources comprise at least two extracted sound sources and managing the at least two extracted sound sources comprises:

selectively removing part of the at least two extracted sound sources and reproducing the remaining sound sources.

9. The method of claim 1, wherein the one or more extracted sound sources comprise at least two extracted sound sources and managing the at least two sound sources comprises:

selecting and deleting images corresponding to part of the at least two extracted sound sources.

10. The method of claim 1, wherein the one or more extracted sound sources comprise at least two extracted sound sources and managing the at least two extracted sound sources comprises:

changing images corresponding to part of the at least two extracted sound sources to another image.

11. A non-transitory computer readable recording medium having embodied thereon a computer program for executing a method for managing a sound source in a digital audio visual (AV) device, the method comprising:

extracting one or more sound sources from sound being reproduced through the digital AV device;

comparing the extracted one or more sound sources to sound source data stored in a sound source database;

mapping an image of the extracted one or more sound sources to a corresponding one of the extracted one or more sound sources based on the results of the comparing operation; and managing the extracted one or more sound sources by using the one or more mapped images, wherein the sound source comprises an object that generates a sound signal having a unique frequency characteristic.

12. An apparatus for managing a sound source in a digital AV device, the apparatus comprising:

an extraction unit which extracts one or more sound sources from sound being reproduced through the digital AV device;

a sound source processing unit which compares the extracted one or more sound sources to sound source data stored in a sound source database;

a mapping unit which maps an image of the extracted one or more sound sources to a corresponding one of the extracted one or more extracted sound sources based on the comparison by the sound source processing unit; and a managing unit which manages the one or more sound sources by using the one or more mapped images, wherein the sound source comprises an object that generates a sound signal having a unique frequency characteristic.

13. The apparatus of claim 12, wherein the extraction unit extracts the one or more sound sources by using frequency characteristics of the sound sources sampled beforehand from the sound being reproduced.

14. The apparatus of claim 12, wherein the mapping unit stores mapping information in relation to the one or more images representing the one or more sound sources in a database.

15. The apparatus of claim 12, wherein the managing unit provides at least one of a function of mapping one or more new images to the one or more extracted sound sources and registering the one or more new images and the mapping information in a database, a function of displaying one or more images corresponding to the one or more sound sources, a function of selectively reproducing part of the one or more extracted sound sources when the one or more extracted sound sources comprise at least two extracted sound sources, a function of selectively removing part of the one or more extracted sound sources and reproducing the remaining sound sources when the one or more extracted sound sources comprise at least two extracted sound sources, a function of selecting and deleting an image corresponding to part of the one or more extracted sound sources when the one or more extracted sound sources comprise at least two extracted sound sources, and a function of changing an image corresponding to part of the one or more extracted sound sources, into another image.

16. The apparatus of claim 15, wherein the function of displaying displays at least one of the representative image, the type and the current reproduction status of each of the one or more extracted sound sources.

* * * * *